(12) United States Patent
Imura (10) Patent No.: US 12,504,078 B2
(45) Date of Patent: Dec. 23, 2025

(54) SLIDING COMPONENT (71) Applicant: EAGLE INDUSTRY CO., LTD., Tokyo (JP)

(72) Inventor: Tadatsugu Imura, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/849,300

(22) PCT Filed: Mar. 13, 2023

(86) PCT No.: PCT/JP2023/009667
§ 371 (c)(1),
(2) Date: Sep. 20, 2024

(87) PCT Pub. No.: WO2023/182056
PCT Pub. Date: Sep. 28, 2023

(65) Prior Publication Data
US 2025/0207667 A1 Jun. 26, 2025

(30) Foreign Application Priority Data
Mar. 24, 2022 (JP) ................................ 2022-047804

(51) Int. Cl.
*F16J 15/34* (2006.01)
*F16C 17/04* (2006.01)
(52) U.S. Cl.
CPC ......... *F16J 15/3416* (2013.01); *F16C 17/045* (2013.01)

(58) Field of Classification Search
CPC ...... F16J 15/34; F16J 15/3404; F16J 15/3408; F16J 15/3412; F16J 15/3416; F16C 17/045
See application file for complete search history.

(56) References Cited

U.S. PATENT DOCUMENTS

| | | | |
|---|---|---|---|
| 2,247,505 A | 7/1941 | Kohler | F16J 15/342 |
| 3,147,013 A | 9/1964 | Tracy | F04D 29/126 |
| 3,957,276 A | 5/1976 | Wiese | F16J 15/3412 |
| 6,152,452 A | 11/2000 | Wang | 277/400 |
| 6,485,021 B1 | 11/2002 | Osaki | F16J 15/3412 |
| 7,258,346 B2 | 8/2007 | Tejima | F16J 15/3412 |

(Continued)

FOREIGN PATENT DOCUMENTS

| | | | |
|---|---|---|---|
| CN | 1215135 | 4/1999 | F16J 15/54 |
| CN | 101975274 | 2/2011 | F16J 15/54 |

(Continued)

*Primary Examiner* — Gilbert Y Lee
(74) *Attorney, Agent, or Firm* — HAYES SOLOWAY P.C.

(57) ABSTRACT

An annular sliding component disposed at a relatively rotating position of a rotating machine and relatively sliding on a counterpart sliding component has a sliding surface provided with a shallow groove which extends in a circumferential direction and which generates a negative pressure, and a deep groove which collects a sealed fluid inside the shallow groove. The shallow groove is disposed on both sides of the deep groove in the circumferential direction, and the sliding surface is further provided with a communication groove which is disposed on a leakage side of a leakage side end portion of the deep groove to communicate with the shallow grooves on both sides in the circumferential direction.

9 Claims, 7 Drawing Sheets

(56) References Cited

U.S. PATENT DOCUMENTS

| | | | |
|---|---|---|---|
| 9,353,867 B2 | 5/2016 | Itadani et al. | F16J 15/3448 |
| 9,714,712 B2 | 7/2017 | Kiernan | F16J 15/3412 |
| 9,850,953 B2 | 12/2017 | Tokunaga | F16C 32/06 |
| 11,009,072 B2 | 5/2021 | Kimura et al. | F16J 15/34 |
| 2005/0094906 A1 | 5/2005 | Satoh | F16C 17/045 |
| 2013/0209011 A1 | 8/2013 | Tokunaga | F16J 32/0633 |
| 2014/0197600 A1 | 7/2014 | Hosoe et al. | F16J 15/40 |
| 2015/0377360 A1 | 12/2015 | Itadani et al. | F16J 15/3488 |
| 2017/0002930 A1 | 1/2017 | Itadani et al. | F16J 15/3412 |
| 2017/0102074 A1 | 4/2017 | Itadani et al. | F16J 15/34 |
| 2018/0073394 A1 | 3/2018 | Tokunaga | F16J 15/3412 |
| 2018/0195618 A1 | 7/2018 | Itadani | F16J 15/342 |
| 2019/0301522 A1* | 10/2019 | Negishi | F16C 17/045 |
| 2021/0080009 A1 | 3/2021 | Kimura | F16J 15/3412 |
| 2021/0355992 A1* | 11/2021 | Tokunaga | F16C 17/102 |
| 2022/0010835 A1* | 1/2022 | Inoue | F16C 33/74 |
| 2022/0099188 A1 | 3/2022 | Imura et al. | F16J 15/3412 |
| 2022/0099191 A1 | 3/2022 | Suzuki | F16C 33/103 |
| 2022/0106980 A1 | 4/2022 | Imura et al. | F16C 17/026 |
| 2022/0120315 A1 | 4/2022 | Ou | F16C 17/045 |
| 2022/0128088 A1 | 4/2022 | Suzuki | F16C 33/107 |
| 2022/0145992 A1 | 5/2022 | Miyazaki | F16C 33/107 |

FOREIGN PATENT DOCUMENTS

| | | | |
|---|---|---|---|
| CN | 107166036 | 9/2017 | F16J 15/16 |
| DE | 3819566 | 12/1989 | F16J 15/34 |
| EP | 0672852 | 9/1995 | F16J 15/34 |
| EP | 3284981 | 2/2018 | F16J 15/34 |
| EP | 3680519 | 7/2020 | F16J 15/34 |
| EP | 3889474 | 10/2021 | F16J 15/34 |
| EP | 3922876 | 12/2021 | F16J 17/04 |
| EP | 4177488 | 5/2023 | F16C 17/04 |
| EP | 4177500 | 5/2023 | F16J 15/16 |
| JP | S59231268 | 12/1984 | F16J 15/34 |
| JP | S59231269 | 12/1984 | F16J 15/34 |
| JP | S6231775 | 2/1987 | F16J 15/34 |
| JP | 2020173020 | 10/2020 | F16J 15/34 |

* cited by examiner

SLIDING COMPONENT

TECHNICAL FIELD

The present invention relates to a sliding component, for example, one of two sliding components that rotate relative to each other and are used for, for example, a shaft sealing device sealing a rotating shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device for preventing the leakage of a sealed fluid, for example, a mechanical seal includes a pair of annular sliding components which rotate relative to each other and slide on each other on their sliding surfaces. In such a mechanical seal, there has been a recent desire to reduce the energy lost through sliding for environmental measures or the like. Therefore, for example, there is known a configuration in which a sliding surface of a sliding component is provided with a positive pressure generating groove that communicates with an outer radial side corresponding to a high-pressure sealed fluid side and is closed at one end of the sliding surface. Accordingly, when the sliding components rotate relative to each other, a positive pressure is generated in the positive pressure generating groove to separate the sliding surfaces from each other and the sealed fluid is introduced into the positive pressure generating groove from the outer radial side so that the sealed fluid is retained in the groove. Accordingly, since lubricity is improved, friction is reduced.

Furthermore, in order to maintain sealing performance over the long term, the mechanical seal requires the conditions of "sealing" in addition to "lubrication". For example, in the mechanical seal illustrated in Patent Citation 1, one sliding component is provided with a Rayleigh step and a reverse Rayleigh step that communicate with the sealed fluid side. Accordingly, when the sliding components rotate relative to each other, a positive pressure is generated between the sliding surfaces due to the Rayleigh step to separate the sliding surfaces from each other and the sealed fluid is interposed between the sliding surfaces to improve lubricity. On the other hand, since a relatively negative pressure is generated in the reverse Rayleigh step and the reverse Rayleigh step is disposed on the leakage side in relation to the Rayleigh step, the high-pressure sealed fluid flowing out from the Rayleigh step into a space between the sliding surfaces can be sucked to the reverse Rayleigh step. Further, a deep groove having a larger volume than that of the reverse Rayleigh step is provided on the relative rotation terminating end side of the reverse Rayleigh step and the sealed fluid collected at the reverse Rayleigh step is returned to the sealed fluid side via the deep groove. In this way, the sealing performance is improved by preventing the sealed fluid between the pair of sliding components from leaking to the leakage side.

CITATION LIST

Patent Literature

Patent Citation 1: WO 2012/046749 A (PAGES 14 to 16, FIG. 1)

SUMMARY OF INVENTION

Technical Problem

In the sliding component of Patent Citation 1, since the relative rotation terminating end of the reverse Rayleigh step communicates with the deep groove and the relative rotation starting end of the reverse Rayleigh step is disposed near one circumferential side of the deep groove, the sealed fluid flowing out from the Rayleigh step into a space between the sliding surfaces can be collected almost in the entire circumference of the sliding surface. However, when the sliding components rotate relative to each other, the sealed fluid may locally flow out from the leakage side end portion of the deep groove into a space between the sliding surfaces, and there is a risk that the sealed fluid flowing out from the deep groove into a space between the sliding surfaces may leak to the leakage side.

The present invention has been made in view of such problems and an object of the present invention is to provide a sliding component capable of suppressing a sealed fluid from leaking toward a leakage side.

Solution to Problem

In order to solve the foregoing problem, according to the present invention, there is provided an annular sliding component disposed at a relatively rotating position of a rotating machine and relatively sliding on a counterpart sliding component, wherein a sliding surface of the sliding component is provided with a shallow groove which extends in a circumferential direction and which generates a negative pressure and, a deep groove which collects a sealed fluid inside the shallow groove and which is deeper than the shallow groove, wherein the shallow groove is disposed on both sides of the deep groove in the circumferential direction, and wherein the sliding surface is further provided with a communication groove which is disposed on a leakage side of a leakage side end portion of the deep groove to communicate with the shallow groove on both sides in the circumferential direction. According to the aforesaid feature of the present invention, since the sealed fluid flowing out from the leakage side end portion of the deep groove toward the leakage side during the relative rotation of the sliding component can be collected by the communication groove, the leakage of the sealed fluid toward the leakage side can be suppressed.

It may be preferable that the communication groove is disposed apart from the leakage side end portion of the deep groove. According to this preferable configuration, a negative pressure is easily kept inside the communication groove and the ability of collecting the sealed fluid using the communication groove can be maintained.

It may be preferable that the communication groove is formed to be equal to the shallow groove in depth. According to this preferable configuration, since a negative pressure is easily generated in the communication groove during the relative rotation of the sliding component, the ability of collecting the sealed fluid using the communication groove is improved. Further, since no step is formed between the communication groove and the shallow groove, the generation of the positive pressure between the communication groove and the shallow groove can be prevented.

It may be preferable that the communication groove is formed to be radially narrower than the shallow groove. According to this preferable configuration, since the volume of the communication groove can be suppressed, the communication groove is less likely to affect the negative pressure generating function of the shallow groove.

It may be preferable that the communication groove is formed in a curved shape protruding toward the leakage side. According to this preferable configuration, it is possible to shorten the length of the entire communication groove while ensuring the separation distance between the communication groove and the deep groove.

It may be preferable that the communication groove has a symmetrical shape with respect to a line extending radially to pass through the deep groove. According to this preferable configuration, it is possible to generate a negative pressure using the communication groove in the same manner in any rotation direction of the sliding component.

It may be preferable that the shallow groove extends over entire circumference of the sliding surface of the sliding component and includes a starting end portion and a terminating end portion in the circumferential direction both of which communicate with the deep groove. According to this preferable configuration, it is possible to generate a negative pressure over the entire circumference of the sliding surface of the sliding component. Further, since the sealed fluid of the terminating end portion of the shallow groove flows into the deep groove, it is possible to suppress a positive pressure from being generated between the sliding surfaces by the shallow groove.

Furthermore, when the shallow groove of the sliding component according to the present invention extends in the circumferential direction, the shallow groove may extend with at least a circumferential component and may preferably extend so that a component along the circumferential direction is larger than a component along the radial direction. Further, when the deep groove extends in the radial direction, the deep groove may extend with at least a radial component and may preferably extend so that a component along the radial direction is larger than a component along the circumferential direction.

Further, the sealed fluid may be a gas or liquid, or may be a mist mixture of a liquid and a gas.

DESCRIPTION OF EMBODIMENTS

Modes for carrying out a sliding component according to the present invention will be described on the basis of the embodiments.

First Embodiment

A sliding component according to a first embodiment of the present invention will be described with reference to FIGS. 1 to 4. Furthermore, in this embodiment, a configuration in which a sliding component is a mechanical seal is exemplified. Further, a description will be made on the assumption that the outer radial side of the sliding component constituting the mechanical seal is a sealed fluid side (high pressure side) and the inner radial side is an atmosphere side (low pressure side) as a leakage side. Further, for convenience of description, dots may be added to grooves formed on the sliding surface in the drawings.

Figure 1:
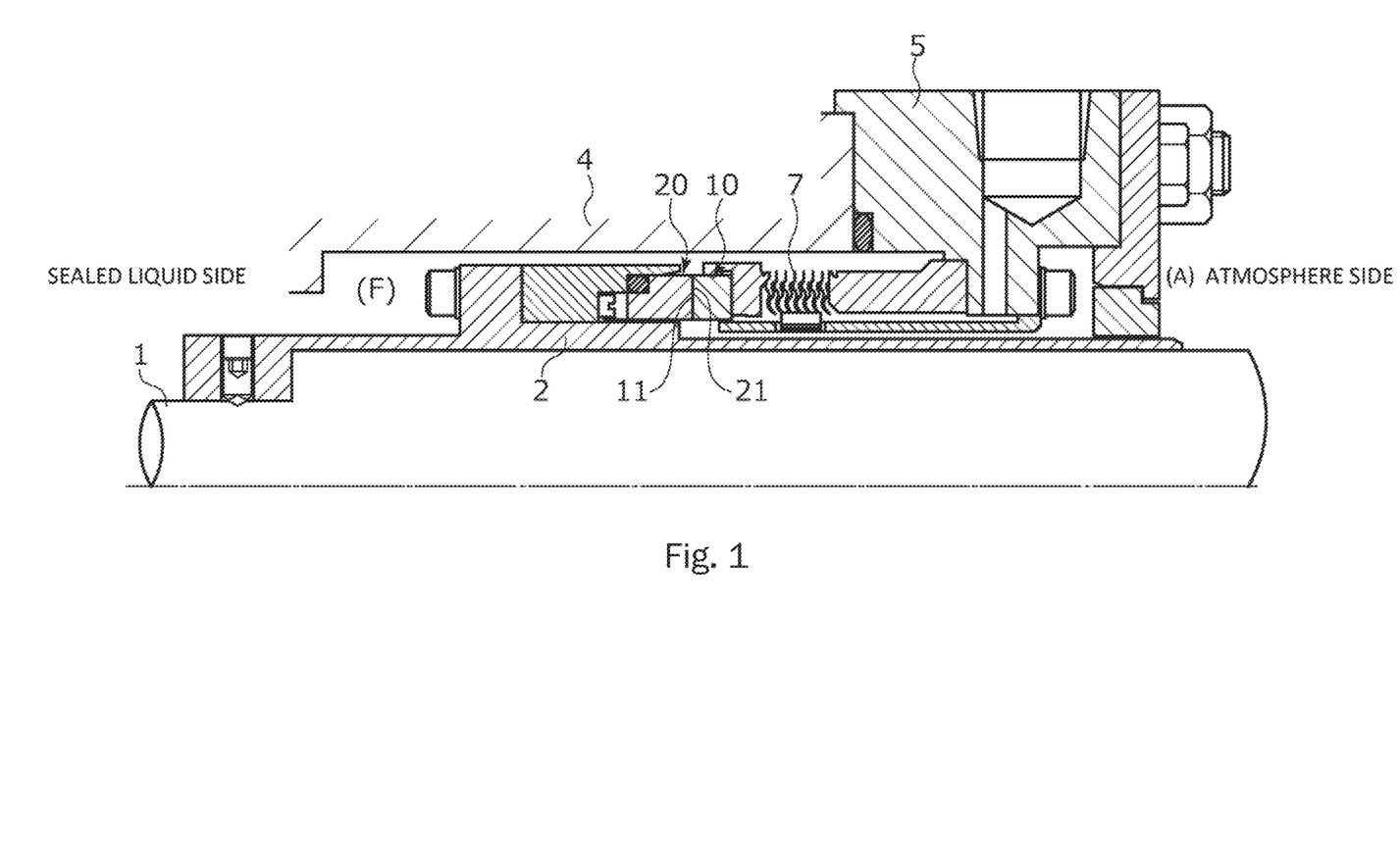
FIG. 1 is a longitudinal sectional view illustrating an example of a mechanical seal including a sliding component according to a first embodiment of the present invention.

The mechanical seal for a general industrial machine illustrated in FIG. 1 is of an inside type that seals a sealed fluid F that tends to leak from the outer radial side of the sliding surface toward the inner radial side. Furthermore, in this embodiment, a configuration in which the sealed fluid F is a high-pressure gas is exemplified.

The mechanical seal mainly includes a rotating seal ring 20 which is an annular sliding component provided in a rotating shaft 1 via a sleeve 2 to be rotatable together with the rotating shaft 1 and a stationary seal ring 10 which is an annular sliding component provided in a seal cover 5 fixed to a housing 4 of an attached device to be axially movable in a non-rotating state and when the stationary seal ring 10 is axially biased by a bellows 7, a sliding surface 11 of the stationary seal ring 10 and a sliding surface 21 of the rotating seal ring 20 closely slide on each other. Furthermore, the sliding surface 21 of the rotating seal ring 20 is a flat surface, and this flat surface is not provided with any recesses.

The stationary seal ring 10 and the rotating seal ring 20 are typically made of SiC (as an example of hard material) or a combination of SiC and carbon (as an example of soft material), but the present invention is not limited thereto. For example, any sliding material can be applied insofar as it is used as a sliding material for a mechanical seal. Furthermore, the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC-TiC, and SiC-TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
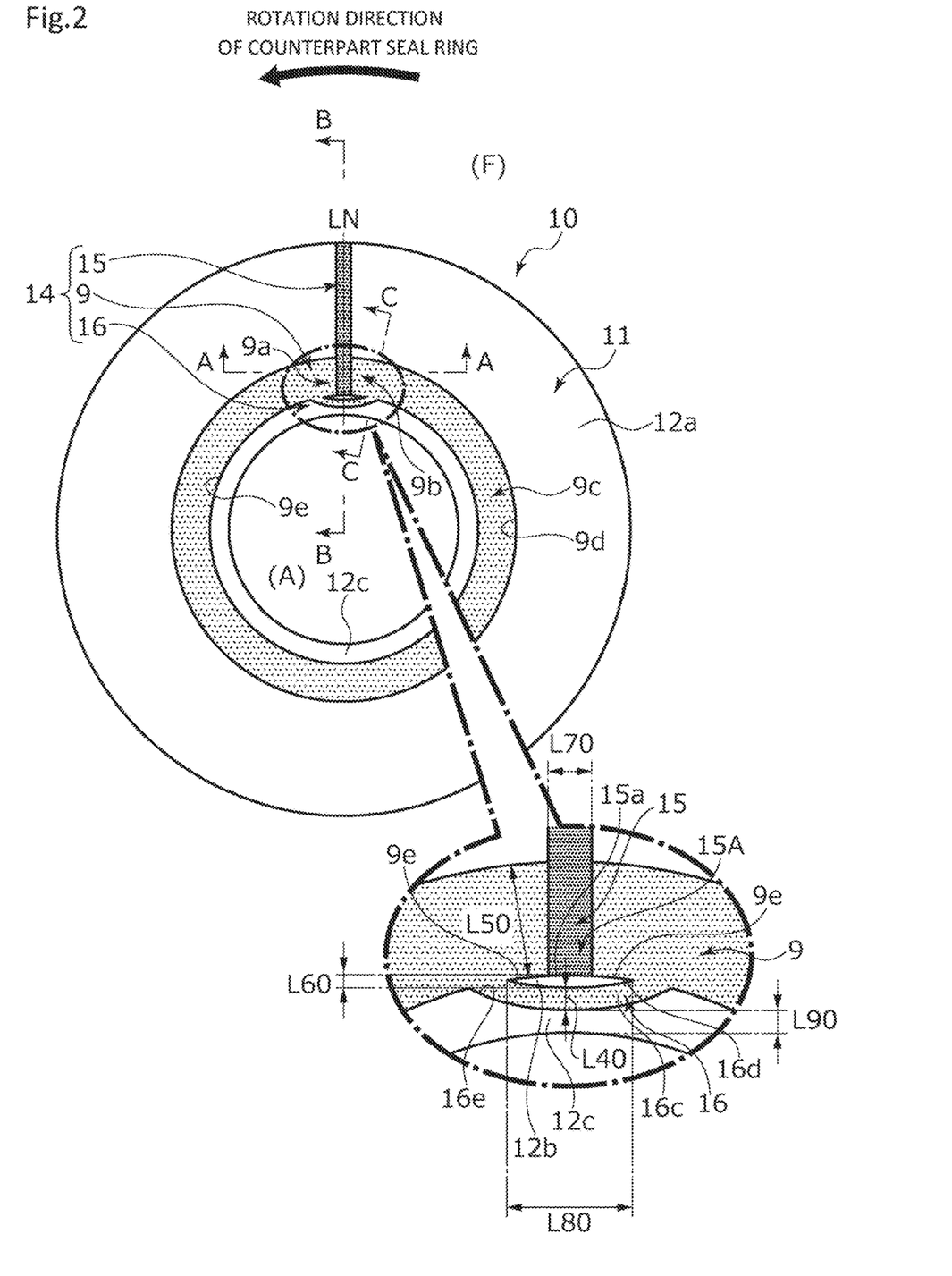
FIG. 2 is a view of a sliding surface of a stationary seal ring when viewed from the axial direction in the first embodiment.

As illustrated in FIG. 2, the rotating seal ring 20 relatively slides on the stationary seal ring 10 as indicated by an arrow. A negative pressure generating mechanism 14 is provided on the sliding surface 11 of the stationary seal ring 10.

The negative pressure generating mechanism 14 includes a fluid guide groove 15 corresponding to a deep groove, a shallow groove 9 for generating a negative pressure, and a communication groove 16. The fluid guide groove 15 communicates with a space on the side of the sealed fluid F and extends radially inward. The shallow groove 9 extends in the circumferential direction concentrically with the stationary seal ring 10 from the downstream circumferential end portion on the inner radial side of the fluid guide groove 15 and is continuously connected to the upstream circumferential end portion on the inner radial side of the fluid guide groove 15. The communication groove 16 communicates a starting end portion 9a and a terminating end portion 9b of the shallow groove 9.

Furthermore, the portions other than the negative pressure generating mechanism 14 of the sliding surface 11 are lands 12a, 12b, and 12c forming flat end surfaces. Further, although not illustrated in the drawings, it is preferable that a positive pressure generating mechanism such as a dimple is formed in the land 12a located on the outer radial side of the shallow groove 9.

Figure 3:
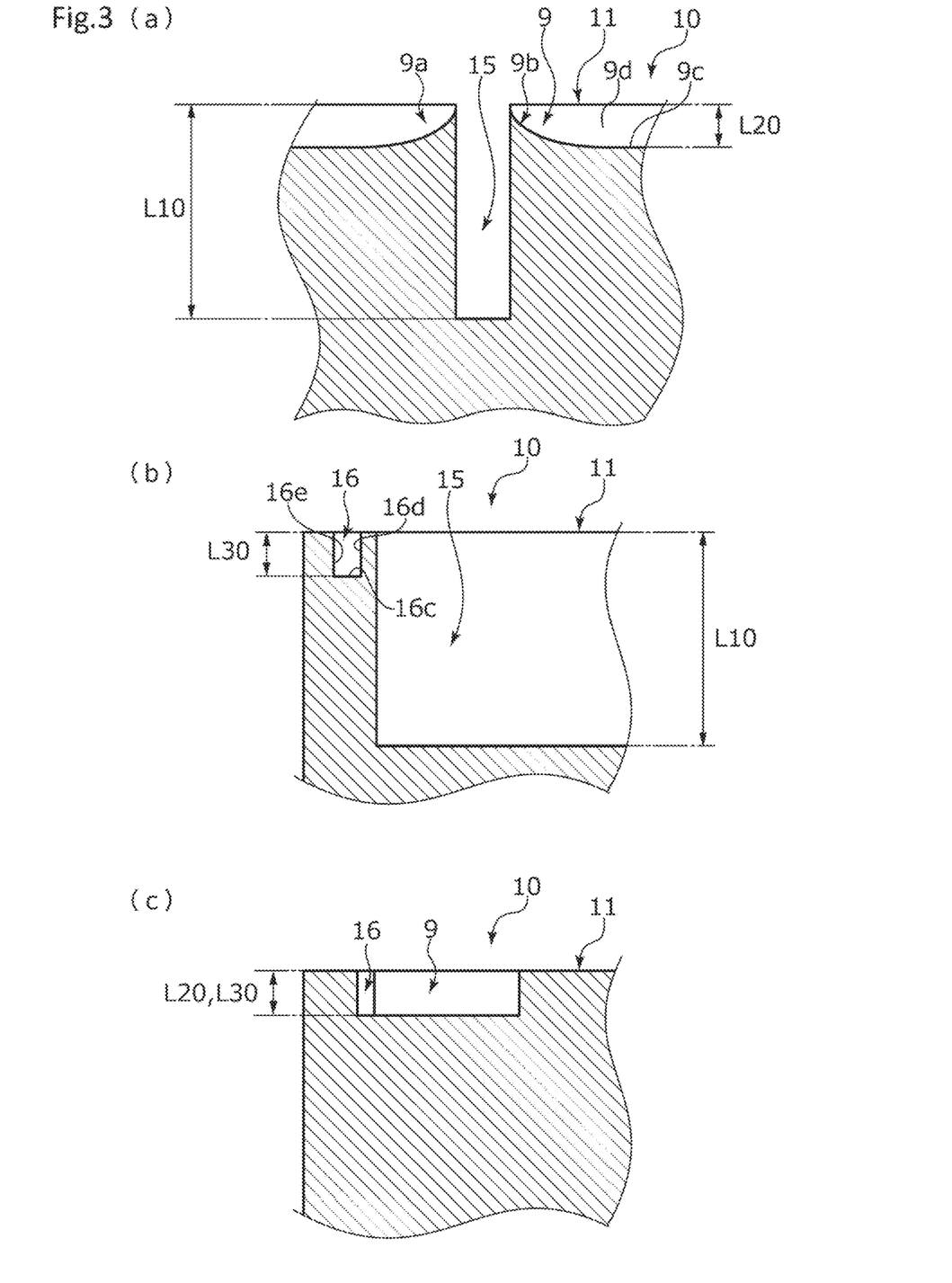
FIG. 3A is a cross-sectional view taken along a line A-A of FIG. 2.
FIG. 3B is a cross-sectional view taken along a line B-B of the same figure.
FIG. 3C is a cross-sectional view taken along a line C-C of the same figure.

Next, the outline of the negative pressure generating mechanism 14 will be described on the basis of FIGS. 2 and 3. Furthermore, hereinafter, in FIG. 2, a description will be made on the assumption that the end portion of the shallow groove 9 connected to the left side of the fluid guide groove 15 in the drawing is the starting end portion 9a of the relative rotation of the shallow groove 9, that is, the upstream side of the sealed fluid F flowing through the shallow groove 9 and the end portion of the shallow groove 9 connected to the right side of the fluid guide groove 15 in the drawing is the terminating end portion 9b of the relative rotation of the shallow groove 9, that is, the downstream side of the sealed fluid F flowing through the shallow groove 9. Furthermore, for convenience of description, the depths of the shallow groove 9 and the communication groove 16 are illustrated to be deeper than the actual depths.

The fluid guide groove 15 of this first embodiment extends in the radial direction of the stationary seal ring 10. Further, the fluid guide groove 15 and the starting end portion 9a and the terminating end portion 9b of the shallow groove 9 are connected, that is, arranged side by side in the circumferential direction. The shallow groove 9 includes a bottom surface 9c, an outer surface 9d erected from the outer radial side of the bottom surface 9c, and an inner surface 9e erected from the inner radial side of the bottom surface 9c. The outer surface 9d and the inner surface 9e are parallel to each other and are orthogonal to the flat end surfaces formed by the lands 12a, 12b, and 12c, respectively. The inner surface 9e and an inner radial end surface 15a of the fluid guide groove 15 are continuously flush in the circumferential direction.

As illustrated in FIG. 3A, the bottom surface 9c extends so that both circumferential end portions, that is, both end portions on the side of the fluid guide groove 15 become shallower toward the fluid guide groove 15. That is, the communication port between the starting end portion 9a of the shallow groove 9 and the fluid guide groove 15 and the communication port between the terminating end portion 9b of the shallow groove 9 and the fluid guide groove 15 are narrowed. Furthermore, the portions other than the end portion on the side of the fluid guide groove 15 in the bottom surface 9c are flat surfaces parallel to the flat end surfaces formed by the lands 12a, 12b, and 12c.

Returning to FIG. 2, the communication groove 16 is formed to communicate the upstream and downstream positions of the end surface 15a of the fluid guide groove 15 in the inner surface 9e of the shallow groove 9. The communication groove 16 is provided apart from an inner radial end portion 15A of the fluid guide groove 15 toward the inner radial side. That is, the land 12b is formed between the fluid guide groove 15 and the communication groove 16.

Specifically, the communication groove 16 includes a bottom surface 16c and an outer surface 16d and an inner surface 16e erected from the bottom surface 16c. The outer surface 16d and the inner surface 16e are parallel to each other and are respectively orthogonal to the flat end surfaces formed by the lands 12a, 12b, and 12c. The communication groove 16 has a curved shape protruding radially inward when viewed from the axial direction and does not communicate with the side of the atmosphere A of the stationary seal ring 10. That is, the annular land 12c is formed on the inner radial side of the communication groove 16 and the shallow groove 9.

Further, the radial width dimension L40 of the communication groove 16 is formed to be narrower than the radial width dimension L50 of the shallow groove 9 (L40<L50).

The maximum width dimension L60 of the land 12b in the radial direction is smaller than the radial width dimension L40 of the communication groove 16 (L60<L40). Furthermore, the radial width dimension L40 of the communication groove 16 is smaller than the circumferential width dimension L70 of the fluid guide groove 15 (L40<L70). Furthermore, the circumferential width dimension L70 of the fluid guide groove 15 is smaller than the radial width dimension L50 of the shallow groove 9 (L70<L50).

Further, the radial width dimension L60 of the land 12b is smaller than the minimum width dimension L90 of the land 12c in the radial direction (L60<L90).

The circumferential width dimension L80 of the land 12b is larger than the circumferential width dimension L70 of the fluid guide groove 15 (L70<L80). Further, the circumferential width dimension L80 of the land 12b is slightly smaller than the radial width dimension L50 of the shallow groove 9 (L80<L50). Furthermore, the circumferential width dimension L80 of the land 12b may be equal to or larger than the radial width dimension L50 of the shallow groove 9 and is preferably within 10 times the width dimension L70.

Further, the communication groove 16 has a symmetrical shape with respect to a line LN extending radially along the fluid guide groove 15. Furthermore, the vicinity of the starting end portion 9a of the shallow groove 9 and the vicinity of the terminating end portion 9b of the shallow groove 9 similarly have a symmetrical shape with respect to the line LN.

As illustrated in FIGS. 3A and 3B, the depth dimension L10 of the fluid guide groove 15 is deeper than the depth dimension L20 of the shallow groove 9 and the depth dimension L30 of the communication groove 16 (L10>L20, L30). Further, as illustrated in FIG. 3C, the depth dimension L30 of the communication groove 16 is a dimension which is the same as the depth dimension L20 of the shallow groove 9 (L20=L30).

Specifically, in this first embodiment, the depth dimension L10 of the fluid guide groove 15 is formed to be 100 μm and the depth dimension L20 of the shallow groove 9 and the depth dimension L30 of the communication groove 16 are formed to be 1 μm. Furthermore, when the depth dimension of the fluid guide groove 15 is formed to be deeper than the depth dimension of the shallow groove 9 and the depth dimension of the communication groove 16, the depth dimensions of the fluid guide groove 15, the shallow groove 9, and the communication groove 16 can be freely changed and the dimension L10 is preferably 5 times or more the dimensions L20 and L30.

That is, the volume of the fluid guide groove 15 is larger than the volume of the shallow groove 9 and the volume of the shallow groove 9 is larger than the volume of the communication groove 16.

Next, the operation during the relative rotation between the stationary seal ring 10 and the rotating seal ring 20 will be described with reference to FIG. 4. First, when the rotating seal ring 20 does not rotate in a non-operating state of a general industrial machine, the sealed fluid F flows into the shallow groove 9 and the communication groove 16 via the fluid guide groove 15. Furthermore, since the stationary seal ring 10 is biased toward the rotating seal ring 20 by the bellows 7, there is almost no leakage amount from a space between the sliding surfaces 11 and 21 to the low pressure side.

When the rotating seal ring 20 rotates relative to the stationary seal ring 10, the sealed fluid F on the outer radial side of the sliding surfaces 11 and 21 is drawn between the sliding surfaces 11 and 21 and the sliding surfaces 11 and 21 are slightly separated from each other due to a positive pressure generated by the positive pressure generating mechanism described above (not illustrated).

Figure 4:
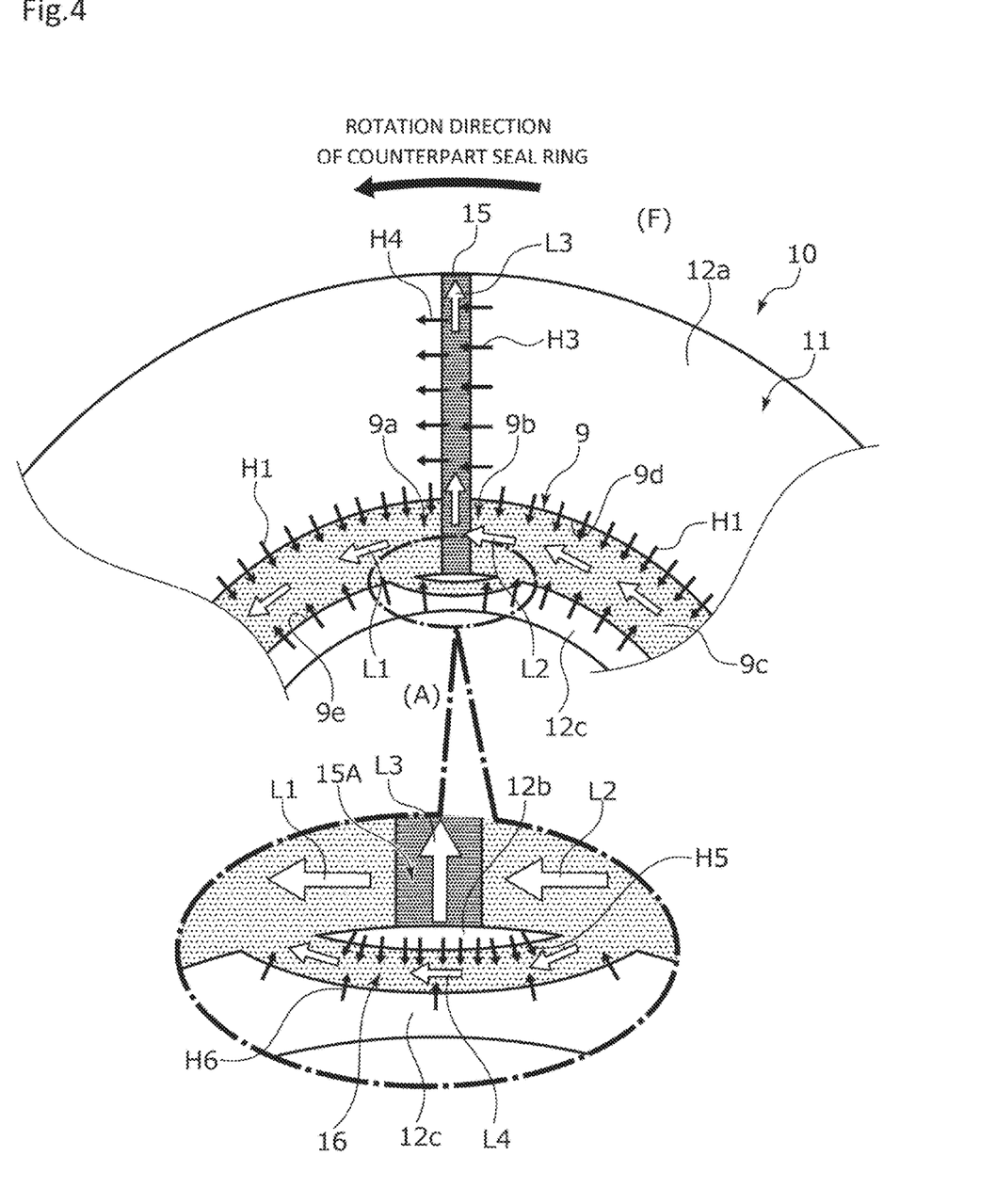
FIG. 4 is an explanatory diagram of the vicinity of a liquid guide groove of a negative pressure generating mechanism when viewed from the axial direction in the first embodiment.

Further, as illustrated in FIG. 4, the sealed fluid F flowing into the shallow groove 9 moves in a following manner in the rotation direction of the rotating seal ring 20 due to the friction with the sliding surface 21 as indicated by the arrow L1. The sealed fluid F moving along the shallow groove 9 flows out to the fluid guide groove 15 as indicated by the arrow L2 at the terminating end portion 9b of the shallow groove 9.

Similarly, the sealed fluid F flowing into the communication groove 16 moves in a following manner in the rotation direction of the rotating seal ring 20 due to the friction with the sliding surface 21 as indicated by the arrow L4.

As described above, since the communication port between the starting end portion 9a of the shallow groove 9 and the fluid guide groove 15 is narrowed, when the relative rotation speed between the stationary seal ring 10 and the rotating seal ring 20 exceeds a certain level, the flow rate of the sealed fluid F flowing through the shallow groove 9 and the communication groove 16 and flowing out to the fluid guide groove 15 is larger than the flow rate of the sealed fluid F supplied from the fluid guide groove 15 to the shallow groove 9 and a negative pressure is generated throughout the shallow groove 9 and the communication groove 16.

Further, when the relative rotation speed between the stationary seal ring 10 and the rotating seal ring 20 exceeds a certain level, the sealed fluid F inside the fluid guide groove 15 is pushed radially outward as indicated by the arrow L3 due to the sealed fluid F flowing from the terminating end portion 9b of the shallow groove 9. Further, since the sealed fluid F constantly flows between the sliding surfaces 11 and 21 from the outer radial side thereof and from inside the fluid guide groove 15 during the relative rotation between the stationary seal ring 10 and the rotating seal ring 20, the lubricity is excellent.

At this time, the sealed fluid F around the shallow groove 9 is sucked into the shallow groove 9 from the lands 12a and 12c as indicated by the arrow H1 due to the negative pressure generated in the shallow groove 9. Further, the sealed fluid F near the fluid guide groove 15 enters the fluid guide groove 15 as indicated by the arrow H3 and a part of the sealed fluid F inside the fluid guide groove 15 flows out between the sliding surfaces 11 and 21 due to the friction or the like with the sliding surface 21 as indicated by the arrow H4.

Further, the sealed fluid F leaking from the inner radial end portion 15A of the fluid guide groove 15 or the terminating end portion 9b of the shallow groove 9 to the inner radial land 12b is sucked into the communication groove 16 as indicated by the arrow H5 due to the negative pressure generated in the communication groove 16 and flows out toward the starting end portion 9a of the shallow groove 9. Furthermore, since a negative pressure is generated in the communication groove 16, the sealed fluid F of the land 12c near the communication groove 16 can also be collected as indicated by the arrow H6.

As described above, the communication groove 16 which communicates the starting end portion 9a and the terminating end portion 9b of the shallow groove 9 is disposed on the inner radial side of the inner radial end portion 15A of the fluid guide groove 15 to surround the inner radial end portion 15A of the fluid guide groove 15 in the circumferential direction. Accordingly, since the sealed fluid F flowing out from the inner radial end portion 15A of the fluid guide groove 15 toward the inner radial side during the relative rotation between the stationary seal ring 10 and the rotating seal ring 20 can be collected by the communication groove 16, the leakage of the sealed fluid F toward the atmosphere A can be suppressed.

Further, the communication groove 16 is provided apart from the inner radial end portion 15A of the fluid guide groove 15 toward the inner radial side. Accordingly, a part of the sealed fluid F of the fluid guide groove 15 flows out from the inner radial end portion 15A to the inner radial land 12b. That is, since a part of the sealed fluid F of the fluid guide groove 15 does not directly flow out into the communication groove 16, a negative pressure is easily kept while suppressing the generation of the positive pressure inside the communication groove 16 and hence the ability of collecting the sealed fluid F using the communication groove 16 can be maintained.

Further, since the depth dimension L30 of the communication groove 16 is formed at the same depth as the depth dimension L20 of the shallow groove 9, a negative pressure can be generated in the communication groove 16 during the relative rotation between the stationary seal ring 10 and the rotating seal ring 20 and hence the ability of collecting the sealed fluid F using the communication groove 16 is improved.

Furthermore, since no step is formed between the communication groove 16 and the shallow groove 9, the generation of the positive pressure between the communication groove 16 and the shallow groove 9 can be suppressed and hence the ability of collecting the sealed fluid F using the communication groove 16 can be maintained.

Further, the width dimension L40 of the communication groove 16 is formed to be narrower than the width dimension L50 of the shallow groove 9. Accordingly, since the volume of the communication groove 16 can be suppressed, the communication groove 16 is less likely to affect the negative pressure generating function of the shallow groove 9.

Furthermore, since the volume of the communication groove 16 is smaller than the volume of the shallow groove 9, the pressure inside the communication groove 16 becomes lower than the pressure of the shallow groove 9 during the relative rotation between the stationary seal ring 10 and the rotating seal ring 20 and hence the sealed fluid F leaking from the inner radial end portion 15A of the fluid guide groove 15 is easily collected by the communication groove 16.

Further, since the communication groove 16 has a curved shape that protrudes radially inward when viewed from the axial direction, it is possible to shorten the entire length of the communication groove 16 while ensuring the radial separation distance between the communication groove 16 and the inner radial end portion 15A of the fluid guide groove 15.

Further, the radial width dimension L60 of the land 12b is smaller than the minimum width dimension L90 of the land 12c in the radial direction (L60<L90). In other words, since the radial width dimension L90 of the land 12c can be ensured largely by suppressing the radial width dimension L60 of the land 12b, the sealed fluid F is less likely to leak into a space on the side of the atmosphere A.

Further, since no corner portion is formed in the communication groove 16, the flow inside the communication groove 16 becomes smooth and hence the generation of the positive pressure inside the communication groove 16 can be suppressed.

Further, since the shallow groove 9 extends concentrically around the entire circumference of the sliding surface 11 and communicates with one fluid guide groove 15 in the circumferential direction at the starting end portion 9a and the terminating end portion 9b, a negative pressure can be generated in the shallow groove 9 over the entire circumference of the sliding surface 11. Further, since the sealed fluid F of the terminating end portion 9b of the shallow groove 9 flows into the fluid guide groove 15, the shallow groove 9 can suppress the generation of the positive pressure between the sliding surfaces 11 and 21.

Further, since the fluid guide groove 15 communicates with the outer radial sealed fluid side, the sealed fluid F collected from the shallow groove 9 and the communication groove 16 can be returned to the outer radial sealed fluid side. Further, when the stationary seal ring 10 and the rotating seal ring 20 rotate relative to each other, the sealed fluid F is easily returned to the outer radial sealed fluid side due to the centrifugal force and the leakage of the sealed fluid F to the low pressure side on the inner radial side of the sliding surfaces 11 and 21 can be reduced.

Further, since the starting end portion 9a and the terminating end portion 9b of the shallow groove 9 have a symmetrical shape with respect to the line LN extending radially along the fluid guide groove 15, it is possible to generate a negative pressure in the same manner as the communication groove 16 regardless of the relative rotation direction of the stationary seal ring 10 and the rotating seal ring 20. Furthermore, when the relative rotation direction of the sliding component is unidirectional, an aperture may be formed at the starting end portion of the shallow groove in the relative rotation direction.

Second Embodiment

Next, a sliding component according to a second embodiment of the present invention will be described with reference to FIG. 5. Furthermore, description of the same configuration and overlapping configuration as in the first embodiment will be omitted.

Figure 5:
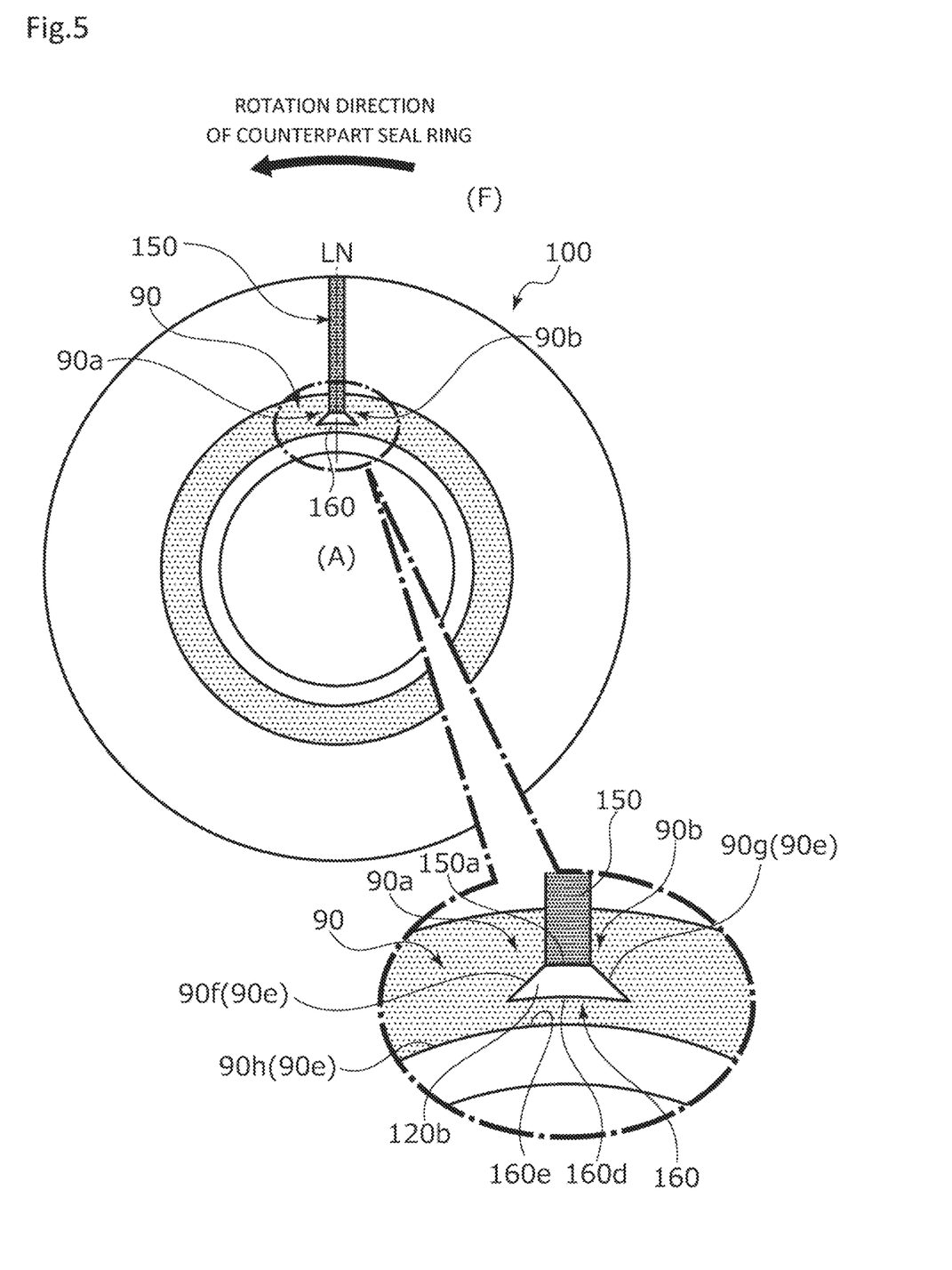
FIG. 5 is a view of a sliding surface of a stationary seal ring as a sliding component according to a second embodiment of the present invention when viewed from the axial direction.

As illustrated in FIG. 5, in a stationary seal ring 100 of this second embodiment, an end portion 90f near a starting end portion 90a and an end portion 90g near a terminating end portion 90b in an inner surface 90e of a shallow groove 90 extend in a linear shape to be inclined radially inward as it goes in the circumferential direction from an inner radial end surface 150a of a fluid guide groove 150 when viewed from the axial direction. That is, the starting end portion 90a and the terminating end portion 90b of the shallow groove 90 have a groove width that becomes narrower toward the fluid guide groove 150. Furthermore, a portion 90h of the inner surface 90e other than the end portions 90f and 90g extends in an arc shape.

A communication groove 160 circumferentially communicates the portions arranged on the inner radial side of an inner radial end surface 150a of a fluid guide groove 150 at the starting end portion 90a and the terminating end portion 90b of the shallow groove 90.

Specifically, an inner surface 160e of the communication groove 160 is continuously flush in the circumferential direction with the portion 90h of the inner surface 90e of the shallow groove 90. Further, an outer surface 160d of the communication groove 160 extends in parallel to the inner surface 160e at a position separated from the end surface 150a of the fluid guide groove 150 toward the inner radial side. That is, a land 120b is formed between the fluid guide groove 150 and the communication groove 160.

In this way, since the communication groove 160 and the fluid guide groove 150 are partitioned by the land 120b, the generation of the positive pressure inside the communication groove 160 is suppressed and hence the ability of collecting the sealed fluid F using the communication groove 160 can be maintained.

Further, since the communication groove 160 has a curved shape that protrudes radially outward when viewed from the axial direction, the flow inside the communication groove 160 can be made smooth.

Furthermore, since the portion 90h other than the end portions 90f and 90g in the inner surface 90e of the shallow groove 90 and the inner surface 160e of the communication groove 160 are arranged on the same circumference and are continuous in the circumferential direction, the flow of the sealed fluid F near the communication port with the shallow groove 90 in the communication groove 160 can be made smooth.

Third Embodiment

Next, a sliding component according to a third embodiment of the present invention will be described with reference to FIG. 6. Furthermore, description of the same configuration and overlapping configuration as in the first embodiment will be omitted.

Figure 6:
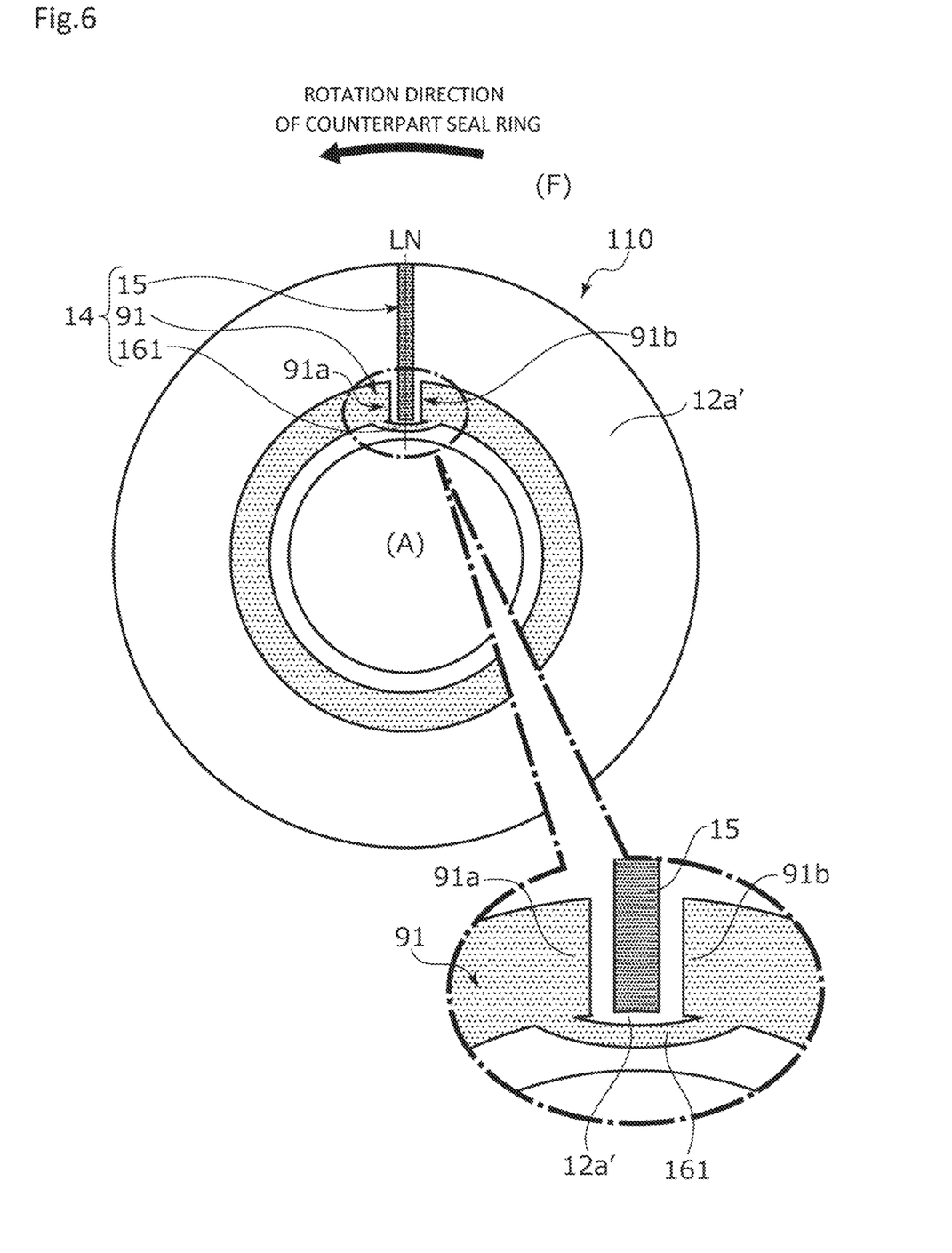
FIG. 6 is a view of a sliding surface of a stationary seal ring as a sliding component according to a third embodiment of the present invention when viewed from the axial direction.

As illustrated in FIG. 6, in a stationary seal ring 110 of this embodiment, a shallow groove 91, a communication groove 161, and the fluid guide groove 15 are partitioned by a land 12a'.

The land 12a' includes a portion which is disposed on the outer radial side of the shallow groove 91, a portion which is disposed between the starting end portion 91a of the shallow groove 91 and the fluid guide groove 15, a portion which is disposed between the terminating end portion 91b of the shallow groove 91 and the fluid guide groove 15, and a portion which is disposed between the communication groove 161 and the fluid guide groove 15.

Since the shallow groove 91, the communication groove 161, and the fluid guide groove 15 are partitioned by the land 12a', a negative pressure is easily generated inside the shallow groove 91 and the communication groove 161 and the ability of collecting the sealed fluid F is excellent. Further, it is possible to reliably generate a negative pressure inside the shallow groove 91 and the communication groove 161 regardless of the relative rotation direction of the sliding component.

Furthermore, when the relative rotation direction of the sliding component is unidirectional, the land may be provided at one circumferential end portion of the shallow groove.

Figure 7:
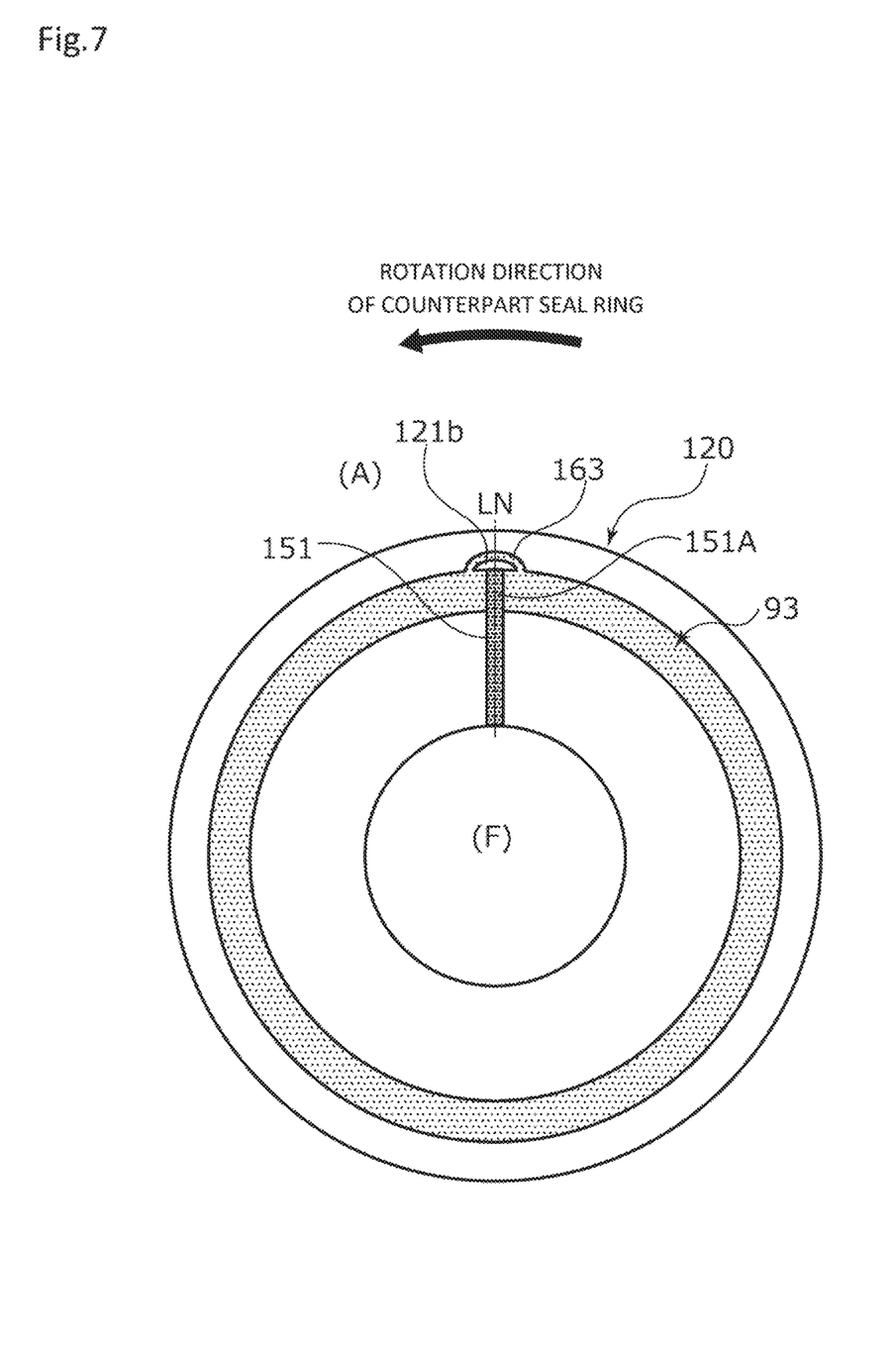
FIG. 7 is an explanatory diagram illustrating a modified example of the mechanical seals in the first to third embodiments.

Furthermore, in the first to third embodiments, although an example of an inside type has been described which seals the sealed fluid F that tends to leak from the outer radial side toward the inner radial side of the sliding surface, the present invention is not limited thereto and an outside type which seals the sealed fluid F that tends to leak from the inner radial side toward the outer radial side of the sliding surface may be employed. Here, an example in which the same concept as in the first embodiment is applied to an outside type will be described with reference to FIG. 7. In this case, in a stationary seal ring 120, a fluid guide groove 151 communicates with a space on the side of the inner radial sealed fluid F, a shallow groove 93 extends in an annular shape in the circumferential direction from an outer radial end portion 151A of the fluid guide groove 151, a communication groove 163 is provided on the outer radial side of the outer radial end portion 151A of the fluid guide groove 151, and a land 121b is formed between the communication groove 163 and the outer radial end portion 151A of the fluid guide groove 151. The shallow groove 93 and the communication groove 163 have a symmetrical shape with respect to the line LN extending radially along the fluid guide groove 151.

Although embodiments of the present invention have been described above with reference to the drawings, the specific configuration is not limited to these embodiments and changes and additions within the scope of the present invention are included in the present invention.

For example, in the first to third embodiments, although an example has been described in which the shallow groove has the same depth except for an aperture portion which is a communication port with the deep groove, the shallow groove may be provided with a step or slope.

Further, in the first to third embodiments, although an example has been described in which the communication groove is formed at the same depth as the deepest portion of the shallow groove, the communication groove may be formed at a different depth from the shallow groove.

Further, in the first to third embodiments, although an example has been described in which a negative pressure is generated in the communication groove, the communication groove may be formed at the depth at which no negative pressure is generated. Even in this case, since the communication groove is disposed on the leakage side of the deep groove, the sealed fluid leaking from the deep groove can be collected.

Further, in the first to third embodiments, although an example has been described in which the communication groove has a curved shape when viewed in the axial direction, the present invention is not limited thereto and the communication groove may have a U-shape when viewed in the axial direction or a linear shape when viewed in the axial direction.

Further, in the first to third embodiments, although an example has been described in which the shallow groove has an annular shape, the present invention is not limited thereto. For example, two independent shallow grooves may be arranged on both sides of one deep groove in the circumferential direction and these grooves may communicate with each other at the communication groove.

Further, in the first to third embodiments, although an example has been described in which the negative pressure generating mechanism includes one shallow groove, one deep groove, and one communication groove, the shallow groove, the deep groove, and the communication groove may be provided at a plurality of positions.

Further, in the first to third embodiments, although an example has been described in which the deep groove communicates with the outer radial sealed fluid side, the present invention is not limited thereto. For example, the deep groove may not communicate with the sliding member at the atmosphere side and the sealed fluid side.

Further, the size and shape of the deep groove can be freely changed as long as no positive pressure is generated between the sliding surfaces or the sealed fluid flowing out from the terminating end portion of the shallow groove can be collected to the extent that the positive pressure can be suppressed.

Further, the cross-sectional shape of the shallow groove may be freely changed as long as the starting end portion and the terminating end portion become shallower toward the deep groove. Furthermore, when the relative rotation direction of the sliding component is only in one direction, at least the starting end portion of the shallow groove may become shallower toward the deep groove.

Further, in the first to third embodiments, although an example has been described in which the shallow groove and the communication groove have a rectangular shape in the radial cross-sectional view, the shapes of the shallow groove and the communication groove may be freely changed. For example, the shallow groove and the communication groove may have a U-shape in the radial cross-sectional view. Accordingly, since no corner portion is formed on the bottom portions of the shallow groove and the communication groove, the flow of the sealed fluid F can be made smooth. Furthermore, in this case, it is preferable to form the opening of the communication portion large so that the communication portion between the shallow groove and the communication groove does not become shallow.

Further, in the first to third embodiments, although an example has been described in which the mechanical seal for the general industrial machine has been described as an example of the sliding component, other mechanical seals for automobiles, water pumps, or the like may also be used. Further, the present invention is not limited to the mechanical seal and may be sliding components other than mechanical seals, such as sliding bearings.

Further, in the first to third embodiments, although an example has been described in which the negative pressure generating mechanism is provided only in the stationary seal ring, the negative pressure generating mechanism may be provided only in the rotating seal ring 20 or may be provided in both the stationary seal ring and the rotating seal ring.

Further, although an example has been described in which the sealed fluid side is the high pressure side and the leakage side is the low pressure side, the sealed fluid side may be the low pressure side, the leakage side may be the high pressure side, and the sealed fluid side and the leakage side may have substantially the same pressure.

REFERENCE SIGNS LIST

9 Shallow groove
9a Starting end portion
9b Terminating end portion
9c Bottom surface
9d Outer surface
9e Inner surface
10 Stationary seal ring (sliding component)
11 Sliding surface
12a to 12c Land 14 Negative pressure generating mechanism
15 Fluid guide groove (deep groove)
16 Communication groove
16c Bottom surface
16d Outer surface
16e Inner surface
20 Rotating seal ring (sliding component)
21 Sliding surface
90 Shallow groove
90a Starting end portion
90b Terminating end portion
91 Shallow groove
91a Starting end portion
91b Terminating end portion
100, 110 Stationary seal ring (sliding component)
120b Land
150 Fluid guide groove (deep groove)
160, 161 Communication groove
A Atmosphere
F Sealed fluid

The invention claimed is:

1. An annular sliding component disposed at a relatively rotating position of a rotating machine and relatively sliding on a counterpart sliding component,
wherein a sliding surface of the sliding component is provided with a shallow groove which extends in a circumferential direction and which generates a negative pressure and, a deep groove which collects a sealed fluid inside the shallow groove and which is deeper than the shallow groove,
wherein the shallow groove is disposed on both sides of the deep groove in the circumferential direction, and
wherein the sliding surface is further provided with a communication groove which is disposed on a leakage side of a leakage side end portion of the deep groove and which is configured to communicate with end portions of the shallow groove on both sides in the circumferential direction, and wherein a land portion is formed between the communication groove and the leakage side end portion of the deep groove.

2. The sliding component according to claim 1,
wherein the communication groove is formed to be equal to the shallow groove in depth.

3. The sliding component according to claim 2,
wherein the shallow groove extends over entire circumference of the sliding surface of the sliding component and includes a starting end portion and a terminating end portion in the circumferential direction both of which communicate with the deep groove.

4. The sliding component according to claim 1,
wherein the communication groove is formed to be radially narrower than the shallow groove.

5. The sliding component according to claim 4,
wherein the shallow groove extends over entire circumference of the sliding surface of the sliding component and includes a starting end portion and a terminating end portion in the circumferential direction both of which communicate with the deep groove.

6. The sliding component according to claim 1,
wherein the communication groove is formed in a curved shape protruding toward the leakage side.

7. The sliding component according to claim 6,
wherein the shallow groove extends over entire circumference of the sliding surface of the sliding component and includes a starting end portion and a terminating end portion in the circumferential direction both of which communicate with the deep groove.

8. The sliding component according to claim 1,
wherein the communication groove has a symmetrical shape with respect to a line extending radially to pass through the deep groove.

9. The sliding component according to claim 1,
wherein the shallow groove extends over entire circumference of the sliding surface of the sliding component and includes a starting end portion and a terminating end portion in the circumferential direction both of which communicate with the deep groove.

* * * * *